(12) United States Patent
Roberts

(10) Patent No.: US 8,461,520 B2
(45) Date of Patent: Jun. 11, 2013

(54) SOURCELESS GAMMA RAY PRODUCTION SYSTEM AND METHODS

(75) Inventor: Loren P. Roberts, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 338 days.

(21) Appl. No.: 12/853,756

(22) Filed: Aug. 10, 2010

(65) Prior Publication Data

US 2011/0049345 A1    Mar. 3, 2011

Related U.S. Application Data

(60) Provisional application No. 61/236,320, filed on Aug. 24, 2009.

(51) Int. Cl.
*G01V 5/10* (2006.01)
(52) U.S. Cl.
CPC ........................................ *G01V 5/101* (2013.01)
USPC .................................... 250/269.6; 250/269.4
(58) Field of Classification Search
CPC ........................................................ G01V 5/101
USPC ............................................ 250/269.6, 269.4
See application file for complete search history.

(56) References Cited

U.S. PATENT DOCUMENTS

| | | | |
|---|---|---|---|
| 4,102,185 | A | 7/1978 | Dowling et al. |
| 5,591,967 | A | 1/1997 | Moake |
| 7,112,783 | B2 * | 9/2006 | Ellis et al. .................. 250/269.4 |
| 7,362,842 | B2 | 4/2008 | Leung |
| 7,365,307 | B2 | 4/2008 | Stoller et al. |
| 2007/0241275 | A1 | 10/2007 | Guo et al. |
| 2009/0065712 | A1 | 3/2009 | Zillmer et al. |
| 2010/0193675 | A1 * | 8/2010 | Stoller .......................... 250/254 |
| 2010/0276581 | A1 * | 11/2010 | Bliven ....................... 250/269.4 |
| 2012/0119076 | A1 * | 5/2012 | Edwards et al. ........... 250/269.1 |

OTHER PUBLICATIONS

International Search Report and Written Opinion dated Apr. 29, 2011 for application No. PCT/US2010/046502.
Adolph, B., et al.; "No More Waiting:Formation Evaluation While Drilling"; Oilfield Review; p. 4-21; Autumn 2005.
Tomozawa, Y.; "High Energy Cosmic Rays, Gamma Rays and Neutrinos from AGN"; downloaded from http://arxiv.org/abs/0802.0301; Feb. 3, 2003; p. 1-4.

* cited by examiner

*Primary Examiner* — Ahshik Kim
(74) *Attorney, Agent, or Firm* — Cantor Colburn LLP

(57) ABSTRACT

An apparatus for performing an operation in a borehole penetrating the earth includes a carrier and a neutron source that emits neutrons and is disposed in the carrier. The apparatus also includes a target disposed in the carrier and that produces gamma rays as a result of interactions between neutrons produced by the neutron source and at least one material forming the target. The apparatus also includes a gamma ray detector that detects the gamma rays produced by the target and is disposed in the carrier.

34 Claims, 12 Drawing Sheets

SOURCELESS GAMMA RAY PRODUCTION SYSTEM AND METHODS

PRIORITY CLAIM

This application claims priority under 35 U.S.C. §119(e) to U.S. Provisional Patent Application Ser. No. 61/236,320, entitled SOURCELESS GAMMA RAY PRODUCTION SYSTEM AND METHODS, filed Aug. 24, 2009 which is hereby incorporated by reference in its entirety.

BACKGROUND

The invention disclosed herein relates gamma rays and, in particular, to generating gamma rays from a target material.

Various operations may be performed in a borehole penetrating the earth in the quest for hydrocarbons. The operations can be related to the exploration and production of hydrocarbons. One type of operation is known as well logging.

Well logging is a technique used to perform measurements of an earth formation, which may contain a reservoir of the hydrocarbons, from within the borehole. In well logging, a logging tool, configured to perform a measurement of the earth formation, is conveyed through a borehole penetrating the earth formation. In one embodiment, an armored cable is used to support and convey the logging tool through the borehole. In general, the wireline contains cables for supplying power to the logging tool and communicating data to and from the logging tool.

The logging tool can be configured to perform various types of measurements of the earth formation. Some of the measurements, such as elemental yields and porosity, require irradiating a portion of the earth formation with neutrons. The measurements of the results of interactions between the neutrons and the earth formation can be related to a property of the earth formation, such as the composition or the porosity of the earth formation.

In one logging tool, a chemical source is used to emit the neutrons needed to perform the measurements. Unfortunately, the chemical source can be costly and not readily available. In addition, because the chemical source is radioactive, certain regulatory concerns are associated with transporting and using the chemical source.

In addition, operation of a neutron source may require monitoring of the neutron source during operation. This may require either in-laboratory testing to create baseline values or real-time monitoring of the neutron source in operation.

SUMMARY

Disclosed is an apparatus for performing an operation in a borehole penetrating the earth. The apparatus includes a carrier and a neutron source that emits neutrons and is disposed in the carrier. The apparatus also includes a target disposed in the carrier and that produces gamma rays as a result of interactions between neutrons produced by the neutron source and at least one material forming the target. The apparatus also includes a gamma ray detector that detects the gamma rays produced by the target and is disposed in the carrier.

Also disclosed is a prompt gamma ray source that includes a neutron source, a moderator material and a target formed at least partially of an element not typically found in a borehole environment.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

For convenience, certain definitions are presented. The term "fusible" relates to atomic nuclei that can join together or fuse in a nuclear fusion reaction. The term "electrostatic inertial confinement" relates to using an electric field to accelerate and confine ions of fusible nuclei in a gaseous state in order to increase the probability of the ions undergoing a nuclear fusion reaction.

A reaction chamber is used to initiate and contain the nuclear fusion reaction. The reaction chamber contains a gas of the nuclei that undergo the nuclear fusion reaction. The reaction chamber may be configured as an inertial electrostatic confinement (IEC) device. The IEC device includes at least one anode and one cathode. In the IEC device, an applied electric field between an anode and a cathode is used to accelerate atomic nuclei in the form of ions towards the center of the chamber. The ions gain energy as they accelerate and form a high ion density cloud. Ions of the gas in the high ion density cloud in turn can collide with each other or with neutral gas constituents in the reaction volume to cause nuclear fusion reactions. From the nuclear fusion reactions, neutrons are emitted.

The emitted neutrons are used to perform an operation downhole such as well logging. While embodiments of well logging are discussed for teaching purposes, the emitted neutrons can be used in any operation requiring an interaction between the neutrons and some material. For well logging, the neutrons interact with an earth formation or a material in a borehole.

Figure 1:
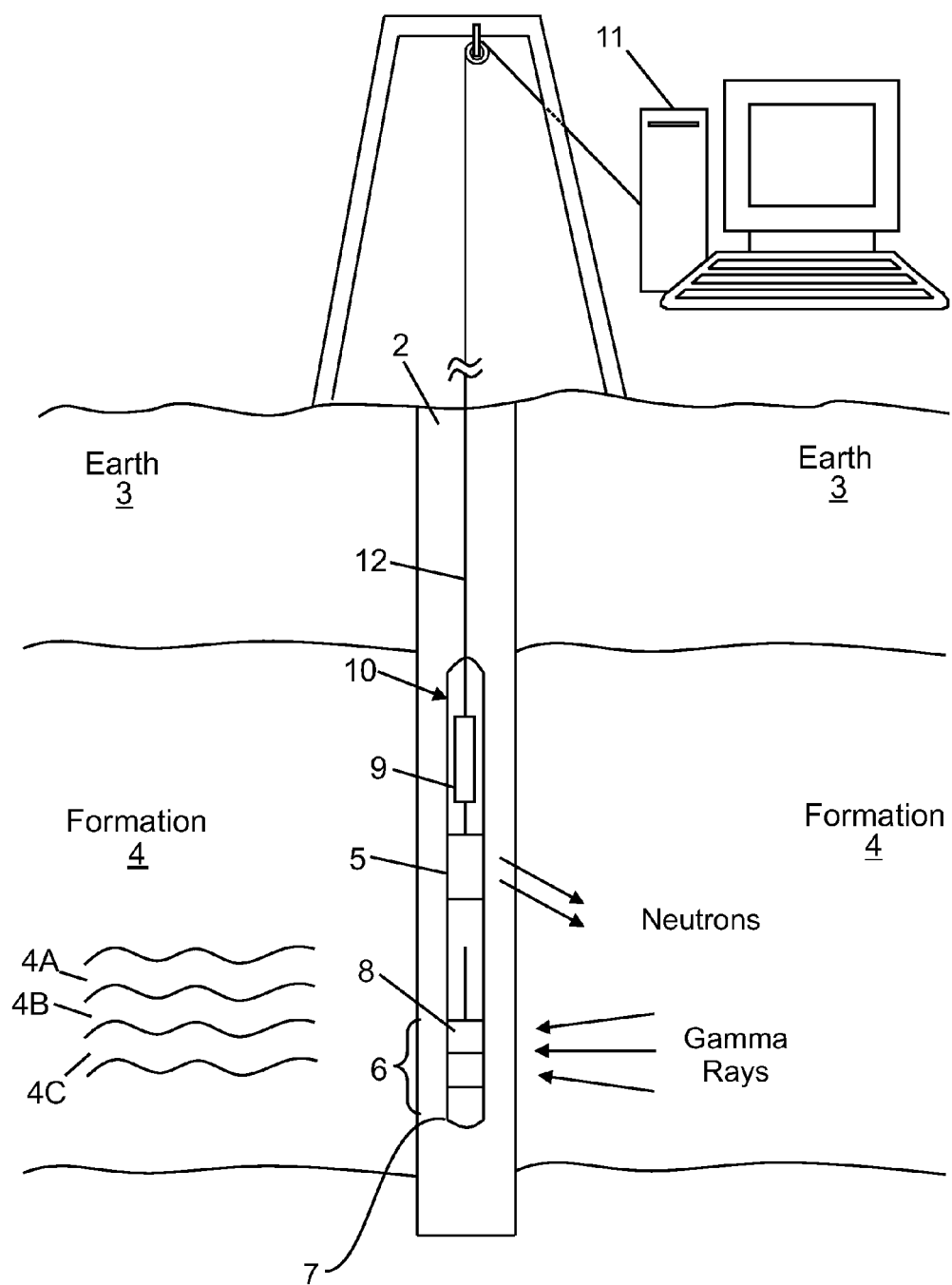
FIG. 1 illustrates an exemplary embodiment of a logging tool disposed in a borehole penetrating an earth formation.

Reference may now be had to FIG. 1. FIG. 1 illustrates an exemplary embodiment of a logging tool 10 disposed in a borehole 2 penetrating the earth 3. The earth 3 includes an earth formation 4, which can include various layers 4A-4C. The logging tool 10 includes a neutron source 5. The neutron source 5 is configured to emit neutrons produced from a nuclear fusion reaction as discussed above. The neutrons travel into the formation 4 and interact with the elements in the formation 4. The logging tool 10 also includes an instrument 6 configured to detect and measure results of the interactions.

In one example of an interaction, a gamma ray is emitted from an interaction between a neutron and an element of the formation 4. Accordingly, the instrument 6 can be configured to detect the gamma ray and measure an amount of energy associated with the gamma ray. In an embodiment as a gamma ray detector, the instrument 6 in general includes a scintillator 7 and a photodetector 8. The scintillator 7 interacts with the gamma ray to produce an amount of light. The photodetector 8 measures the amount of light to determine the amount of energy associated with the gamma ray. Non-limiting properties of the formation 4 that may be determined with the logging tool 10 include porosity, elemental yields, density, and a boundary between layers 4A-4C.

Referring to FIG. 1, the logging tool 10 includes an electronic unit 9. The electronic unit 9 can be used to operate the logging tool 10 and/or store data from measurements performed by the logging tool 10. For example, the electronic unit 9 can monitor components in the neutron source 5 and set parameters such as voltage levels to enable operation of the neutron source 5. When the electronic unit 9 stores data, the data can be retrieved when the logging tool 10 is removed from the borehole 2. Alternatively, the data can be transmitted to a processing system 11 disposed at the surface of the earth 3 using a telemetry system such as wired pipe or pulsed-mud for example. The processing unit 11 can also be configured to send commands to the logging tool 10.

Referring to FIG. 1, a wireline 12 is used to support the logging tool 10 and to convey the logging tool 10 through the borehole 2. As an alternative, a slickline, coiled tubing or a drill string may be used to convey the logging tool 10 through the borehole 2.

For purposes of this discussion, it is shown in FIG. 1 that the borehole 2 is vertical and the layers 4A-4C are horizontal. The teachings herein, however, can be applied equally well in deviated or horizontal wells or with the formation layers 4A-4C at any arbitrary angle. The teachings are equally suited for use in logging-while-drilling (LWD) applications and in open-borehole and cased-borehole applications. In LWD applications, the logging tool 10 may be disposed in a collar attached to the drill string. When used in LWD applications, drilling may be halted temporarily to prevent vibrations while the logging tool 10 is performing a measurement.

Figure 2A:
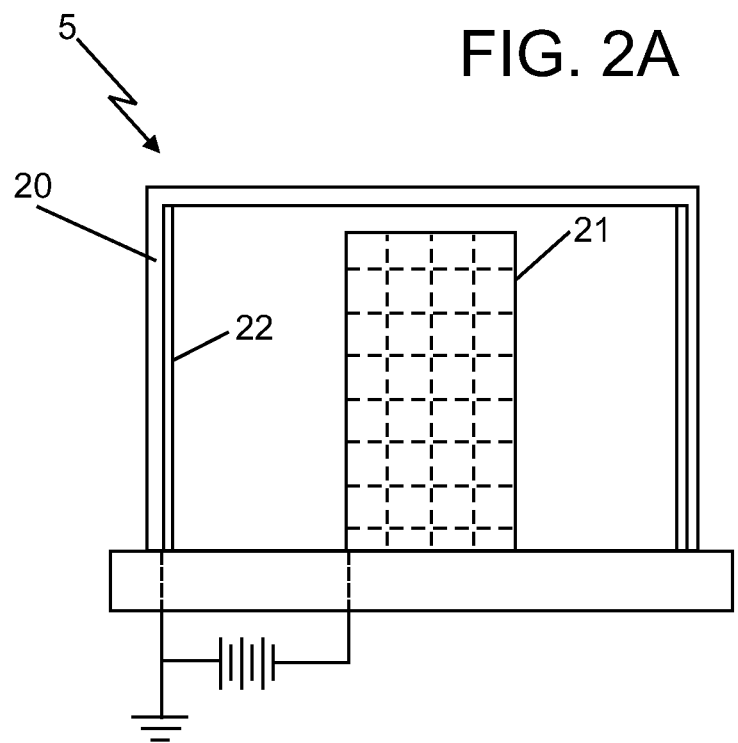
FIGS. 2A and 2B, collectively referred to as FIG. 2, illustrate an exemplary embodiment of a neutron source disposed at the logging tool.

The neutron source 5 is now discussed in more detail. FIG. 2 illustrates an exemplary embodiment of the neutron source 5. FIG. 2A illustrates a cross-sectional side view of the neutron source 5. The neutron source 5 includes a reaction chamber 20 configured to contain a nuclear fusion reaction. The reaction chamber 20 contains components necessary to produce the nuclear fusion reaction. The reaction chamber 20 is configured to contain a gas of fusible nuclei at low pressures on the order of 4.0 Pa or less. Disposed inside the reaction chamber 20 and positioned relative to the reaction chamber 20 is a transparent cathode grid 21. In the embodiment of FIG. 2, the reaction chamber 20 is configured to be an anode 22 with respect to the cathode grid 21. Thus, the anode 22 can be the reaction chamber 20. The cathode grid 21 is configured to be transparent to ions formed from the gas of fusible nuclei thereby minimizing a loss of ions to the grid and allowing recirculation of ions that do not undergo a nuclear fusion reaction. The recirculated ions increase the chance for these ions to undergo the nuclear fusion reaction in the future.

Figure 2B:
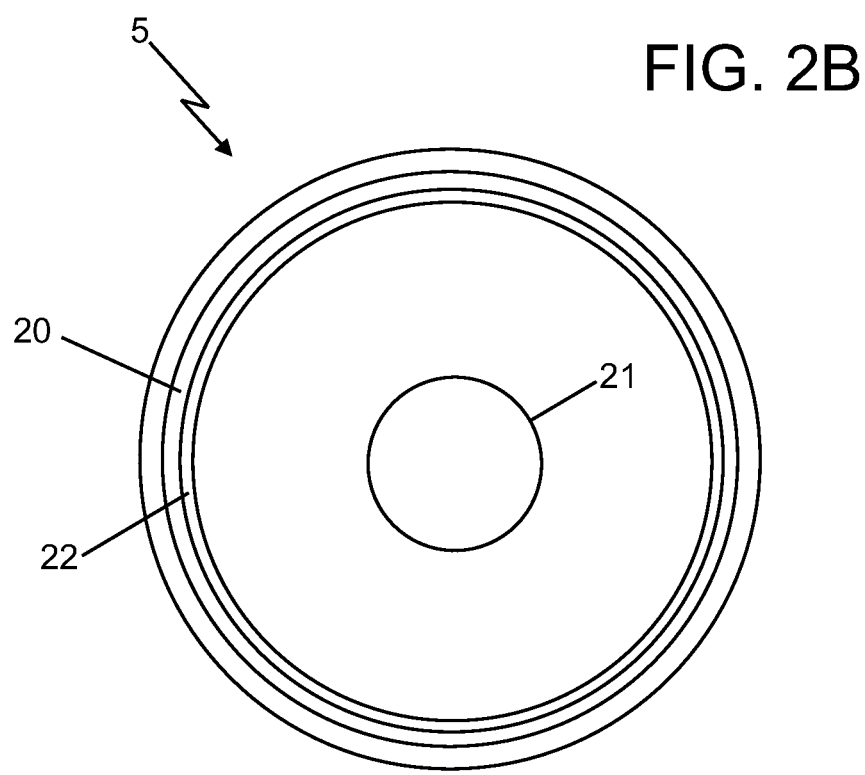

FIG. 2B illustrates a top cross-sectional view of the neutron source 5. The reaction chamber 20 (and therefore the anode 22) and the cathode grid 21 are cylindrically shaped. In other embodiments, the anode 22 and the cathode grid 21 can be spherically shaped or have other shape. The cathode grid 21 may be concentric or otherwise contoured relative to the anode 22 in order to focus the ions to the center of chamber 20. By focusing the ions to the center of the chamber 20, a sufficient density of the ions are formed that increase the probability of the ions colliding and producing a nuclear fusion reaction. With the anode grounded, the voltage applied to the cathode grid is generally in the range of −50 to −200 kV.

In general, factors such as the shape and configuration of the reaction chamber 20, the anode 22, and the cathode 21 are selected to achieve a type or pattern of neutron discharge. For example, the factors can be selected to achieve a discharge of neutrons from approximately a point source. Alternatively, the factors can be selected to achieve a discharge of neutrons from a line source of a certain shape or from an area of a certain shape.

In the glow discharge mode, the gas of fusible nuclei is partially ionized by the electric field established between the anode 22 and the cathode 21 with the gas pressure at about 1 to 3 Pa for deuterium.

Figure 3:
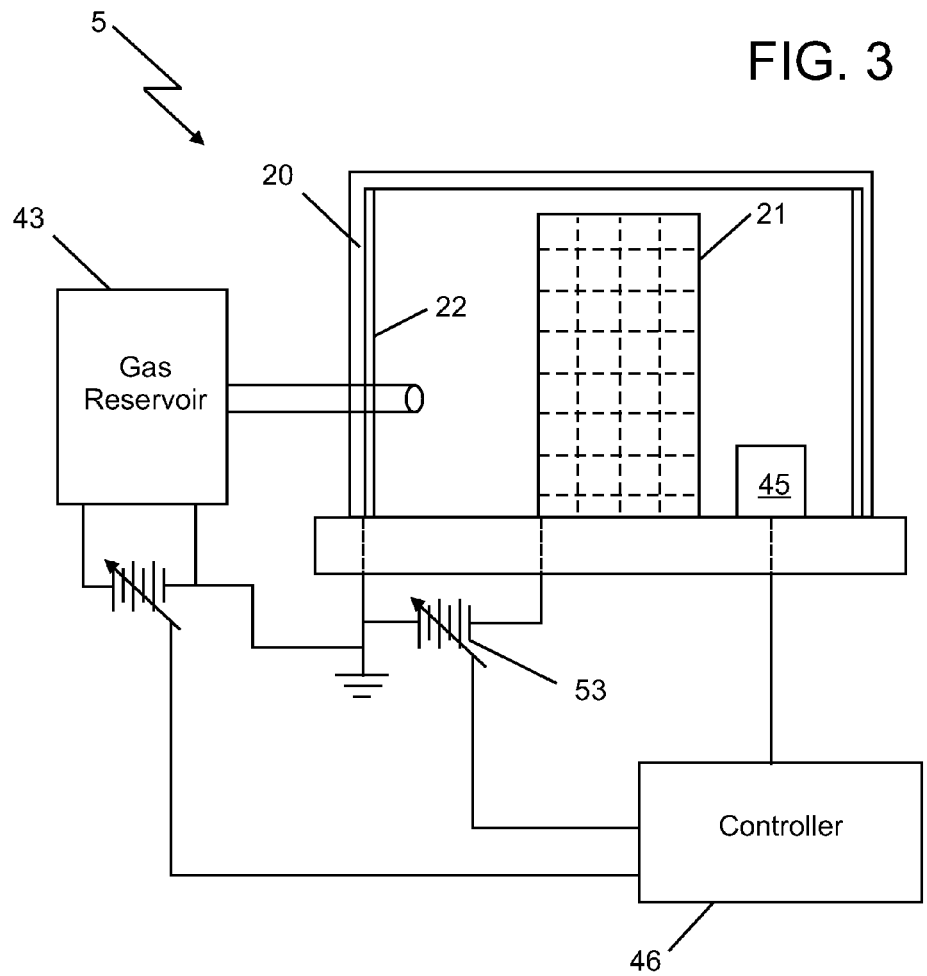
FIG. 3 shows a suppression scheme that may be used to suppress electrons emitted by secondary emission in order to minimize current and associated power that is unproductive toward neutron generation.

A suppression scheme may be used to suppress electrons emitted by secondary emission in order to minimize current and associated power that is unproductive toward neutron generation. The suppression scheme can include an electrodes 30 disposed in the reaction chamber 20 generally between the anode 22 and the cathode 21 as shown in FIG. 3. The electrode structure 30 is transparent and can be a grid assembly similar to the cathode 21. In general, the electrode structure 30 has the same shape as the cathode 21. The electrode 30 is energized at an appropriate voltage to minimize the flow of electrons from Some processes for generating neutrons by nuclear fusion reactions can also be optimized by using the automatic control system. Referring to FIG. 3, the controller 46 receives input from the detector 45. The controller 46 can optimize the number of neutrons produced by providing control signals to a gas reservoir 47. The gas reservoir 47 may be either of the integral type or of the indirectly heated type and may be of any suitable material for absorbing and releasing hydrogen isotopic gases reversibly. In addition, the controller 46 can provide control signals to a power supply 53 for adjusting voltages of the various anodes and cathodes used in the neutron source 5 to control and optimize neutron production.

In order for the controller 46 to effectively control production of the generation of neutrons, it may need to have access to either pre-created data or real time or both. The teachings herein may be used to create either pre-created or real time data (or information related to determining such data).

The preceding description with respect to FIGS. 1-3 is by way of example only and is merely illustrative. The following description includes systems and method for creating gamma rays and applications thereof. In this description some terms are used that have the following definitions.

The terms "neutron capture" or "capture" make reference to a kind of nuclear interaction in which a neutron collides with an atomic nucleus and is merged into the nucleus, thus forming a heavier nucleus. As a result, the heavier nucleus enters into a higher energy state. At least some of the energy of the neutron capture interaction is usually lost by emission of gamma rays.

The terms "inelastic collision," "neutron inelastic scattering" or "inelastic" make reference to a collision in which an incoming neutron interacts with a target nucleus and causes the nucleus to become excited, thereby releasing a gamma ray before returning to the ground state. In inelastic collisions, the incoming neutron is not merged into the target nucleus, but transfers some of its energy to the target nucleus before that energy is released in the form of a gamma ray.

Various types of interactions involve either absorption or emission of gamma radiation. Predominant types (as a function of increasing energy) include photoelectric effect, Compton scattering and pair production. As a matter of convention, "photoelectric effect" relates to interactions where electrons are emitted from matter after the absorption of a gamma ray. The emitted electrons may be referred to as "photoelectrons." The photoelectric effect may occur with photons having energy of about a few eV or higher. If a photon has sufficiently high energy, Compton scattering or pair production may occur. Generally, Compton scattering relates to a decrease in energy (increase in wavelength) of a gamma ray photon when the photon interacts with matter. In pair production, higher energy photons may interact with a target and cause an electron and a positron pair to be formed.

Figure 4:
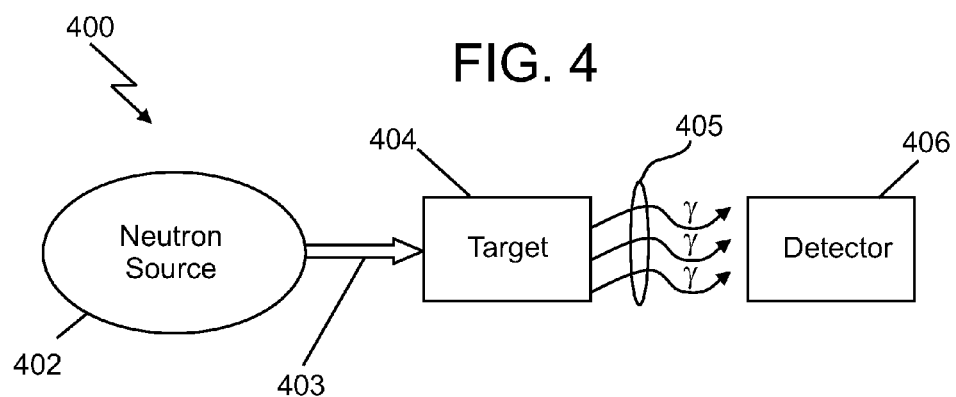
FIG. 4 shows a block diagram of a system for the production of gamma rays.

FIG. 4 shows a simplified version if a system 400 according to one embodiment of the present invention. This system, as well as the others disclosed herein, may be referred to generally as a gamma ray source. In so far as the systems disclosed herein do not rely on the radioactive decay of an element for the production of gamma rays, the systems disclosed herein may also be referred to sourceless gamma systems or sources. A chemical source, such as AmBe and Cf-252, can be used as a neutron source, also.

The system 400 includes a neutron source 400. The term "neutron source" shall refer to any type of device that emit neutrons, irrespective of the mechanism used to produce the neutrons. An example of particular type of neutron source is given above with respect to FIGS. 2 and 3 but is not limited thereto. The neutron source 402 produces neutrons 403.

The system also includes a target 404. The target 404 may be formed of any material that when contacted by neutrons 403 produces gamma rays 405. In one embodiment, the system may also include one or more gamma ray detectors 406. The gamma ray detector may be a passive material that waits for a gamma ray interaction to occur in a detector volume. The interaction causes an effect (such as a photoelectric, Compton, or pair production effect) that may be measured by measurement electronics (not shown). The measurement electronics may be able, based on the interaction, to measure the energy and number of gamma rays produced by the target 404 due to its interactions with the neutrons. Of course, the gamma ray detectors 406 are not needed if only the production of gamma rays is sought, not their measurement.

Figure 5A:
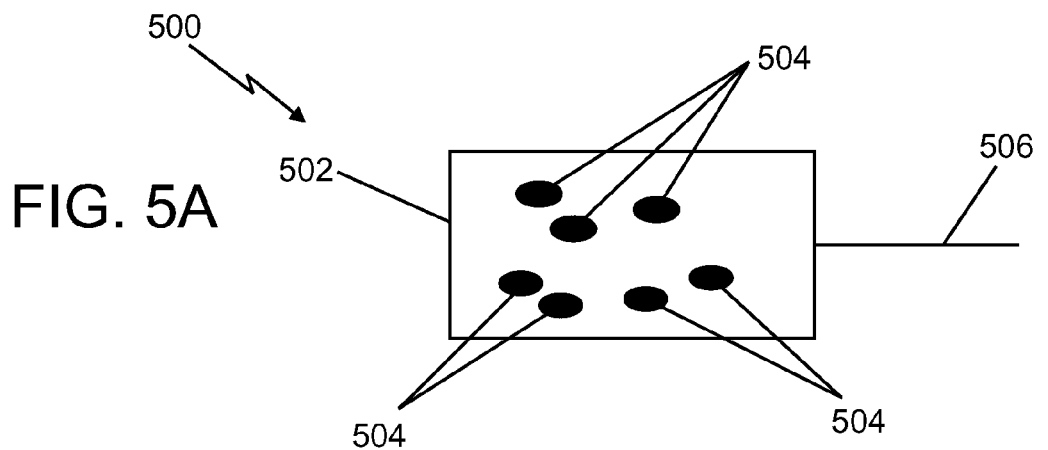
FIGS. 5A-5C shows possible target configurations according to various embodiments of the present invention.
Figure 5B:
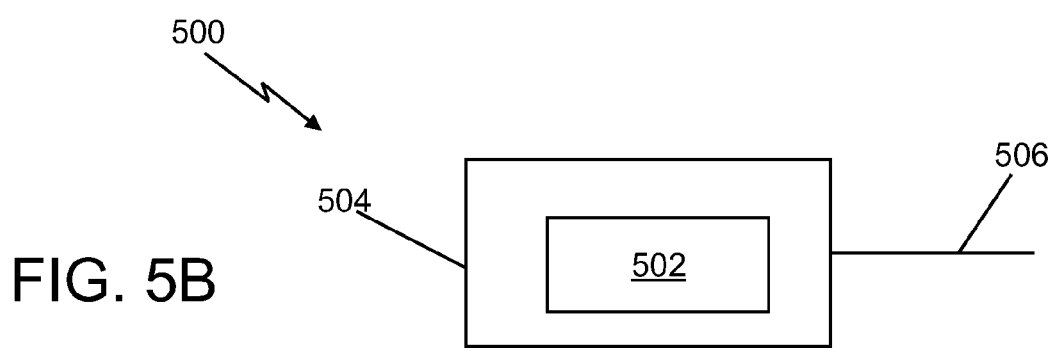
Figure 5C:
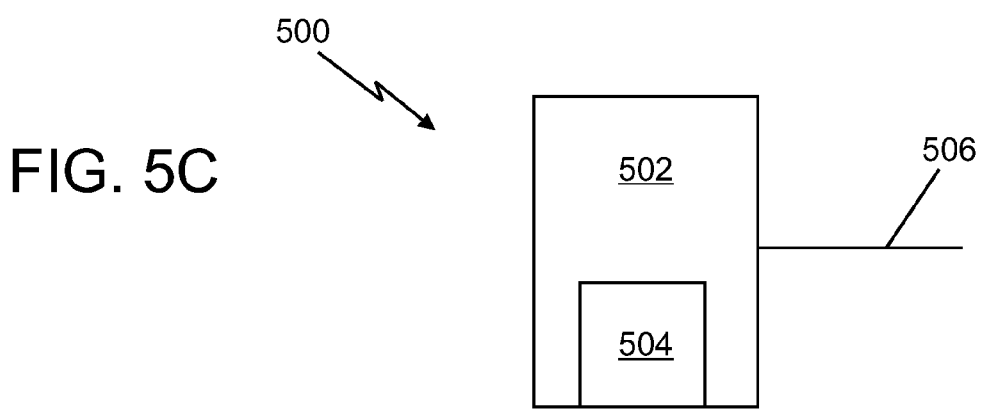

FIGS. 5A-5C show various embodiments of combined target-detectors 500 according to the present invention. In general, each of the combined target-detectors 500 combine the target 404 and detector 406 shown in FIG. 4.

In FIG. 5A a combined target-detector 500 includes a detector 502 that is doped with a target material 504. The detector 502 is coupled to a detection line 506 used to connect the detector 502 to measurement electronics. When exposed to neutrons, the target material 504 emits gamma rays that contact the detector 502.

In FIG. 5B an alternative embodiment of a combined target-detector 500 is shown. In this embodiment, the detector 502 is surrounded by a packaging layer formed of target material 504. The detector 502 is coupled to the detection line 506 used to connect the detector 502 to measurement electronics. When exposed to neutrons, the target material 504 emits gamma rays that contact the detector 502.

In FIG. 5C, yet another alternative embodiment of a combined target-detector 500 is shown. In this embodiment, the detector 502 is a well-type detector that includes target material disposed at least partially therein. The detector 502 is coupled to the detection line 506 used to connect the detector 502 to measurement electronics. When exposed to neutrons, the target material 504 emits gamma rays that contact the detector 502.

It has been discovered that in operation of, for example, a borehole device, it may become necessary or desirable to monitor the output of a neutron source. For example, it may be desirable to determine the output of the neutron source 5, in real time (on line), utilized in a tool 10 as shown in FIG. 1. In particular, quantitative measurement of the output of a neutron source 5 may be needed. Such a measurement may be desirable for any log that does not use purely relative values and uses a high energy neutron source. Indeed, such measurement may be particularly desirable in the development of a sourceless density (pseudo density) log.

To these ends, one embodiment of the present invention may be directed to systems and methods that measure the high-energy neutron flux directly by using inelastic gamma ray scattering from a target material. One embodiment includes placing a target 404 (FIG. 4) between a neutron source and the gamma ray detector in a tool 10 such as that shown in FIG. 1.

Past attempts for measuring the output of a neutron source have included providing a neutron sensitive detector in a tool. Such an approach, however, is inherently sensitive to lower energy neutrons and, thus, environmental variation. Another prior attempt to measure neutron source output included monitoring the ion beam current in pulsed neutron generators. This method is indirect and based on assumptions of ion beam composition, reaction rate in the target, and variations in neutron generator operation over time. Furthermore, gamma ray spectroscopy attempts to remove all gamma rays produced within the tool body as undesirable background. Shielding is specifically designed to limit gamma rays produced within the tool body from reaching the detectors.

Figure 6:
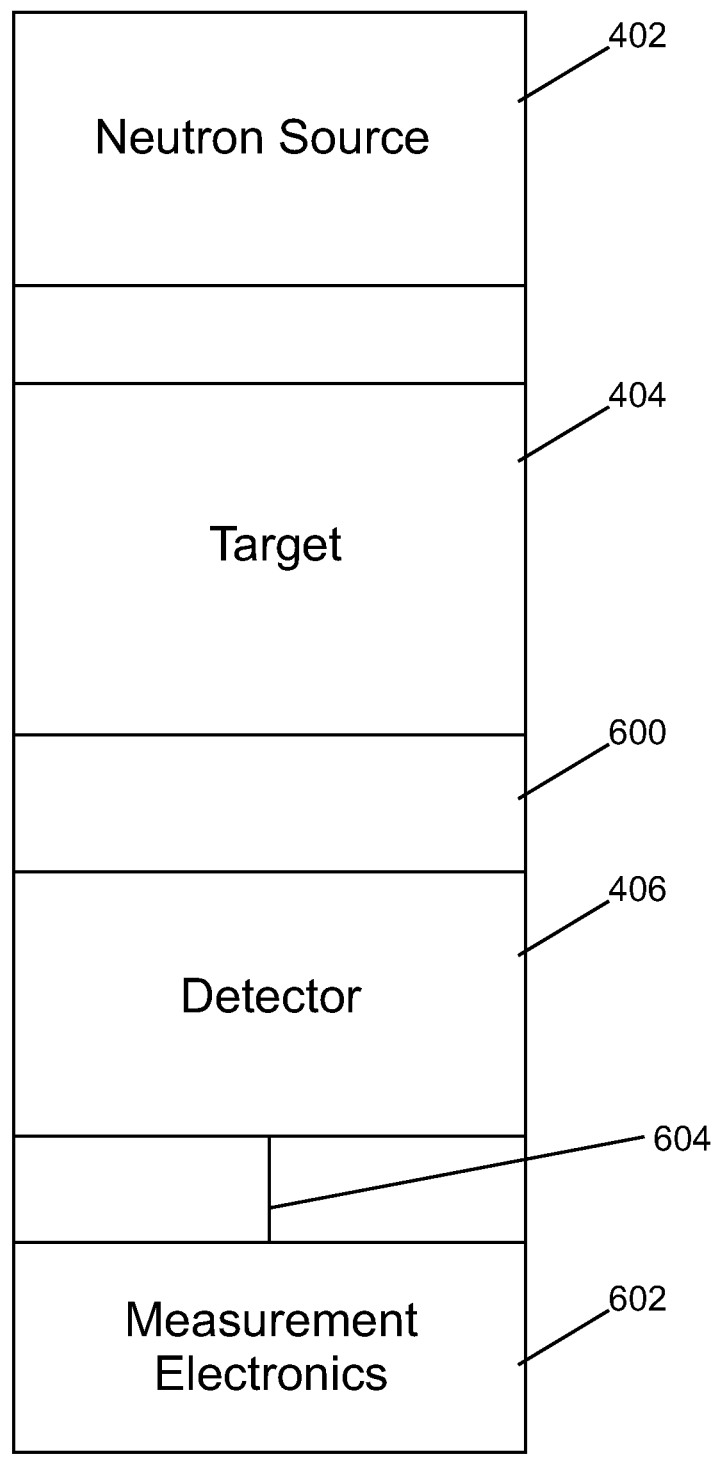
FIGS. 6 shows an example of a tool 600 according to one embodiment of the present invention.

FIG. 6 shows an example of a tool 600 according to one embodiment of the present invention. The tool 600 may be borehole tool 10 (FIG. 1), for example. The invention, however, is not limited to borehole tools and may be implemented within any tool where neutron source strength measurements may be needed or desirable. The tool 600 includes a neutron source 402. A target 404 is at least partially within the tool 600. In one embodiment, the target 404 is placed between the neutron source and a detector 406 that may be at least partially within the tool 600. Of course, the detector 406 may be coupled to measurement tools 602. The measurement tools 602 may be within the tool 600 or at another location and electrically coupled to the detector 406 as indicated by connection 604. The connection 604 could be, in one embodiment, wireless and in others it could be a direct or indirect electrical connection.

It shall be understood that the target 404 may be contained in or formed as part of the detector 406. For example, the target 404 and the detector 406 may be combined to form a combined target-detector 500 as shown in any of FIGS. 5A-5C. Of course, the target 404 and the detector 406 may be combined to form a combined target-detector 500 in other configurations as well. For example, the detector may be a liquid detector that includes solute targets.

It shall be understood that the target 404 may be formed of any type of material. In one embodiment, the target 404 may be formed of a material that is rarely encountered in oil well formations, and if so, in very small concentrations. Of course, the particular location and materials found in that location may dictate this decision. In one embodiment, the target 404 may be formed such that it has a high weight percent of the selected material. In one embodiment, the selected target material may produce gamma rays from inelastic scattering of high energy neutrons and have an energy that is detectable using standard detectors. The material may be selected such that the gamma rays it produces have energies that do not significantly interfere (overlap) with common inelastic and capture gamma rays from a typical well bore environment.

In operation, the number of inelastic gamma ray counts in the detector 406 originating from the target 404, minus background, may be correlated directly to the neutron source output. This correlation may be produced via modeling and laboratory measurements. The term background used here is to refer to all gamma rays not originating from the target material, regardless of their use for other measurements.

Figure 7:
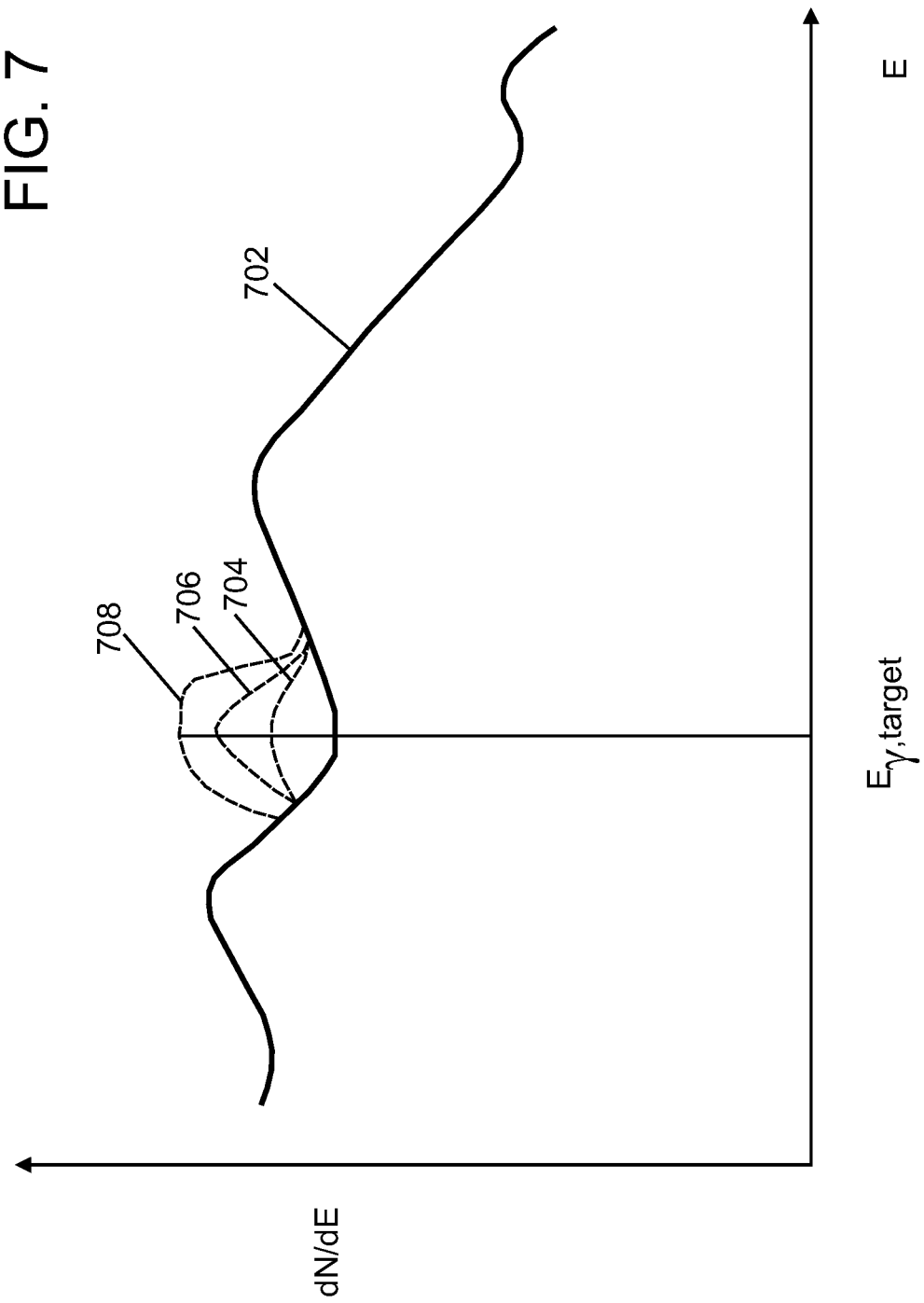
FIG. 7 is a graph showing various peaks in a gamma ray spectrum.

FIG. 7 shows a graph correlating neutron source strength to energy sensed by a detector. In particular, the illustrative and arbitrary graph shown in FIG. 7 shows the rate of neutron production per unit energy (dN/dE) as compared to energy of gamma rays received by the detector. Line 702 is an illustrative plot of neutron production to energy for general background gamma rays received by the detector. According to one embodiment of the present invention, the selected target material produces gamma rays at or about an energy of $E_{\gamma, target}$. Lines 704, 706 and 708 indicate, respectively, that as neutron source output increases the amplitude of the of the gamma rays received at energy $E_{\gamma, target}$ increases. This amplitude may be used, for example, by the controller 46 to vary the operation of the neutron source 5 (FIG. 3).

Referring back to FIG. 6, in one embodiment, the target 404 may be shielded such that high energy neutrons capable of inelastic scattering within the target 404 are predominantly limited to traveling directly from the source to the target. This may further ensure the production of inelastic target gamma rays is a direct measure of source strength and not influenced by the borehole and formation environment. Indeed, variations in borehole and formation characteristics may produce different neutron energy distributions resulting in varied reaction rates within the target if it is not shielded.

Additionally, according to one embodiment, the volume of target 404 may be formed to account for source 402 and detector 406 spacing and the nuclear probabilities for inelastic scattering within the target 404. The volume may be varied to optimize count rate. It shall be understood that the volume of the target 404 may be shaped such that it conforms to any geometrical space available and varied to obtain a sufficient number of gamma rays for an accurate measurement.

Figure 8:
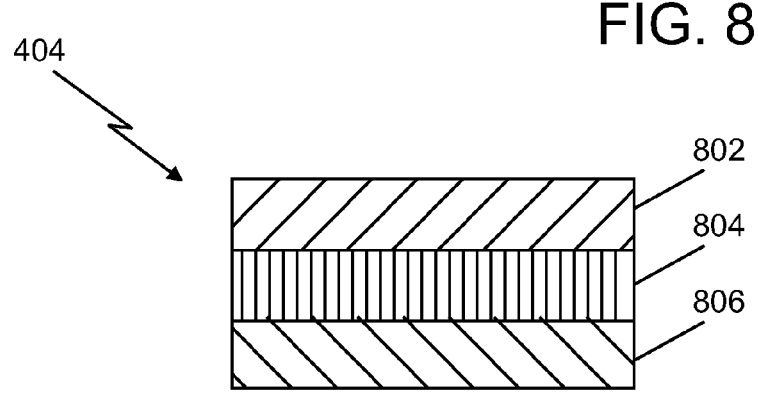
FIG. 8 shows an example of a multi-material target according to an embodiment of the present invention.

In one embodiment, the target 404 may be formed of two or more different materials. For example, and as shown in FIG. 8, the target 404 may be formed a first material 802, a second material 804 and a third material 806. This may provide for three separate energy peaks as each material may produce gamma rays of differing energy levels.

Figure 9:
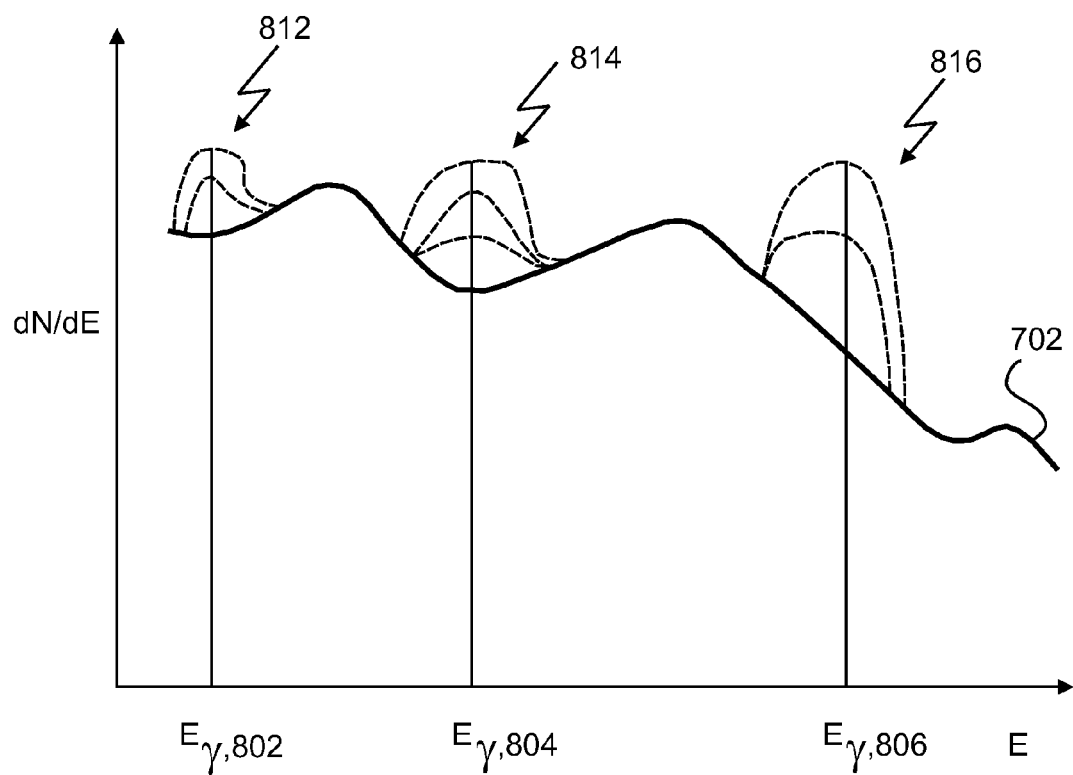
FIG. 9 is a graph showing multiple peaks in a gamma ray spectrum made by the multi-material target of FIG. 8.

FIG. 9 is a graph similar to that shown in FIG. 7 and having the same axes. In FIG. 9, the graph shows three separate variable peaks 812, 814 and 816, one for each of the materials (802, 804 and 806) shown in FIG. 8. In such an embodiment, variable amplitudes may appear at different energy levels corresponding to each material used in a multi-material target 404 (FIG. 8).

In some instances, it may be necessary to calibrate gamma ray detectors as a function of energy during logging while drilling to acquire spectral data. One approach to meeting this need has been to place radioactive seed sources in the detectors or tool, but this may create complications due to the regulations for radioactive material shipping, customs, etc. In particular, a seed source must be of very low-level activity to avoid the transportation regulations, but it still must be treated as radioactive material. The low level activity leads to insufficient count rates that are not readily measured above the signal from inelastic and capture gamma rays when a high energy neutron source is present.

In an attempt to overcome some or all of these problems, a lead (Pb) target 404 may be utilized in a tool 600 (FIG. 4). The use of lead target may be used to calibrate, in a know manner, the detectors. There are many reasons to used a lead target to create gamma rays for use in calibration techniques.

Firstly, Pb is not a common material in the earth and is not a material of interest for petrophysical study of formations. Pb is typically found in ppm or ppb levels in formations. Thus, the presence of a lead target will not mask any desired information about lead in the formation because there is nothing present/desired. Indeed, lead will not occur in large enough quantities in the formations to significantly alter the lead peak produced by a lead target.

In addition, utilizing a Pb target may generate characteristic gamma rays from neutron inelastic scattering of a specific energy that will not interfere with current gamma ray spectral measurements. In particular, Pb-208, which is 52% of natural lead, emits gamma rays of specific energies when bombarded by high energy neutrons such as from an accelerator-based deuterium-tritium (D-T) neutron source. The energy and yield of the gamma rays produced by a lead target do not overlap the inelastic gamma rays typically being measured in a borehole from common formation elements such as calcium (Ca), oxygen (O), Silicon (Si), magnesium (Mg), copper (C), titanium (Ti), etc. In particular, the primary gamma ray peak from lead is from the isotope Pb-208 and is of energy 2615 keV. The nearest peaks of interest that appear in an inelastic and capture spectrum of common formation materials are hydrogen at 2223 keV and silicon at 3539 keV, both of which are from capture. Furthermore, it may be desirable to measure only inelastic gamma rays for energy calibration when a pulsed neutron source is used because then the nearest neighbors are Si at 1779 keV and O at 3738 keV. A peak at 803 keV can be similarly used.

Figure 10:
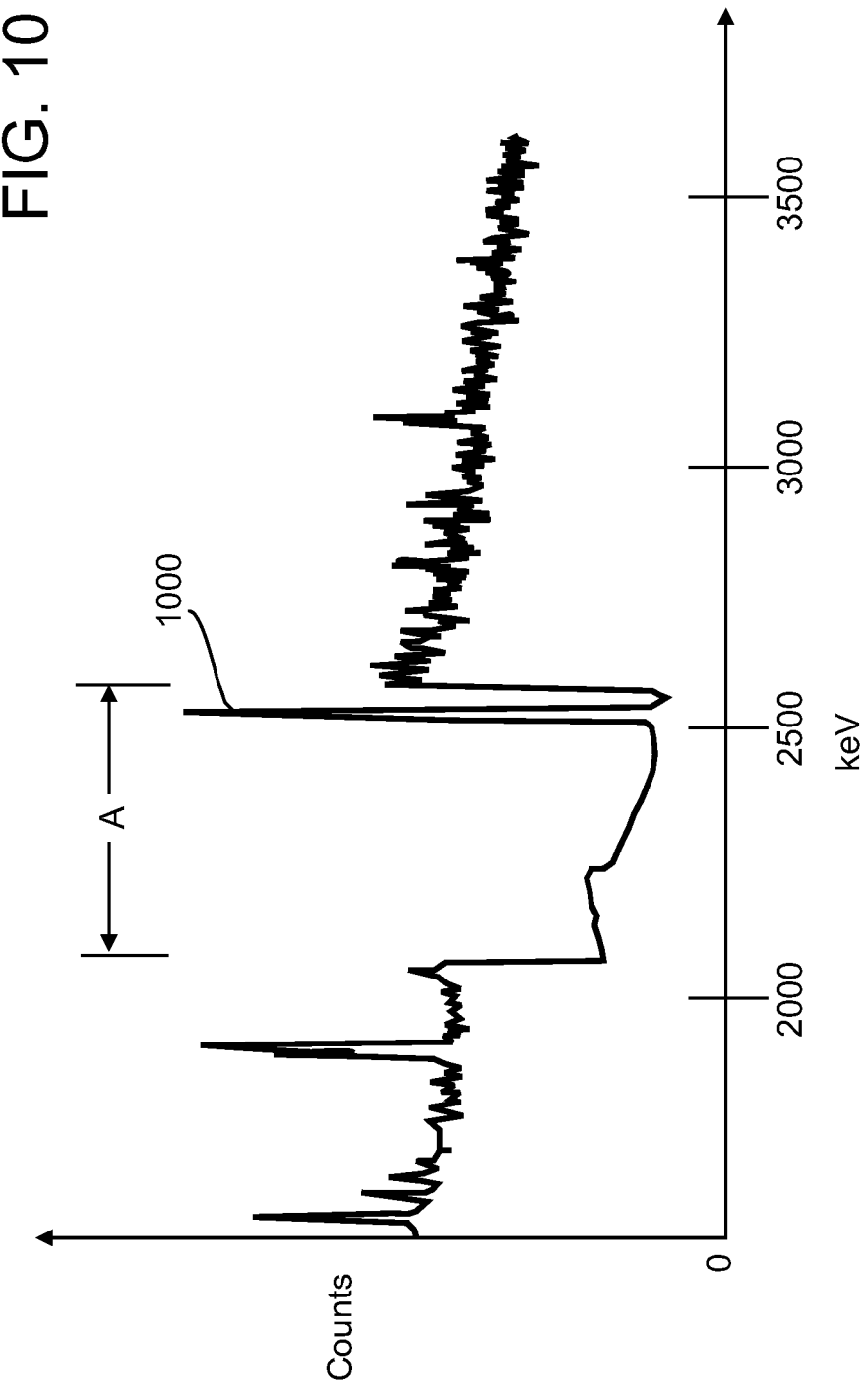
FIG. 10 shows an example of a gamma ray spectrum (measured in counts) for lead.

FIG. 10 shows an example of a gamma ray spectrum (measured in counts) for lead. In this example, the region shown as A has been scaled down by 0.33. The spectrum shown is just an example but it does illustrate that the primary gamma ray peak 1000 from Pb-208 occurs about 2615 keV. The primary peak 1000 is significantly larger than other peaks in the spectrum. Accordingly, this peak 1000 is identifiable and distinguishable from other near peaks from, for example, Si and O. The 803 keV peak is also shown.

Utilizing lead as a target for calibration may also be beneficial because it may be used in logging-while-drilling (LWD) and Wireline applications because the melting point of lead is 327 C.

As described above with respect to FIG. 8, the target may be formed of multiple elements. For calibration, multiple materials can be used to produce multiple energy calibration points. This may allow for nonlinear calibrations, and linear two-point calibrations that do not use 0 keV as a calibration point. To this end, materials other than Pb can be used as long as they are not commonly found in the formations and not typically measured in formations. For example, bismuth may be utilized because it has multiple peaks in the 2493-2741 keV range, low abundance in formations, and a high melting point.

The preceding discussion has assumed that it may not be advantageous to use the tool body materials' background peaks from an LWD tool for energy calibration or source strength monitoring. Such a tool may typically be formed of a material called INCONEL which is composed primarily of nickel (Ni), chromium (Cr), and iron (Fe). These have primary inelastic peaks at 1332, 1434, and 847 keV, respectively. Both Ni and Cr are too close in energy to Mg at 1369 keV, which occurs in dolomites and other formations. These elements, plus others commonly found in the construction of well logging tools, are typically desired to be measured within the formation.

In some instances, it may be desirable to be able to produce high-energy gamma rays in the laboratory environment for experiments involving detector testing, mineralogy, source-less density, and other gamma ray applications. In one embodiment, a system as shown in FIG. 4 may be utilized to that end. The following description details an embodiment where the system of FIG. 4 may be utilized in a laboratory environment.

Currently, it is impractical to produce gamma rays above the energy of Co-60 (1.17 and 1.33 MeV) using chemical based sources due to their short half-lives. Further, it is impractical to produce these gamma rays through inelastic scattering of neutrons due to: 1) low gamma ray yields; 2) the need to operate a high energy accelerator-based neutron source; and 3) the need to conduct all operations inside a shielded bunker with limited space and time-use availability. Some or all of these problems may be overcome by the production of prompt gamma rays from neutron capture utilizing neutrons from a chemical source or accelerator based source.

Target materials for the neutron capture reaction include gadolinium (Gd) and mercury (Hg), etc. Gadolinium (Gd-157) has a 6.75 MeV gamma ray with effective gamma production cross section of 965 barns. Mercury (Hg-199) has a 5.97 MeV gamma ray with effective cross section of 62.5 barns. Both materials produce a spectrum of over 100 gamma rays that may be used for other purposes, but the primary consideration here relates to the high-energy gamma rays (for example, Hg has 4.739 MeV gamma at 30 barns). The nearest gamma rays to the Gd 6.75 MeV gamma ray are at 6.67 MeV, but these gamma rays have an effective cross section 9 time less than the 6.75 gamma. The nearest gamma rays to the Hg 5.9 MeV gamma are at 5.7 and 6.3 MeV with effective cross sections of 28 and 4 barns, respectively. Thus, the desired peaks from both of these materials will be prominent in the detected spectra and distinguishable from peaks created by other materials. It should be noted, that a combination of peaks at effective peak energy may be used for lower resolution detectors that don't resolve these high energy peaks. For example, C0-60 has two peaks but, typically, a single average energy is considered at 1.25 MeV instead of 1.17 and 1.33 MeV. The same principle can be applied here.

For laboratory experiments, both Gd and Hg are readily available and target size is not an issue for this source design. However, Gd is a solid metallic and easy to work with. Note that both materials can be placed in the same target setup to deliver dual high-energy peaks. The volume of Gd can be adjusted lower by a factor of 15 to match the gamma production of the Hg target. Natural abundances by weight percent of the desired isotopes are 15.65% for Gd-157 and 16.87% for Hg-199. Therefore, a natural sample for both contains large amounts of the desired isotope.

Figure 11:
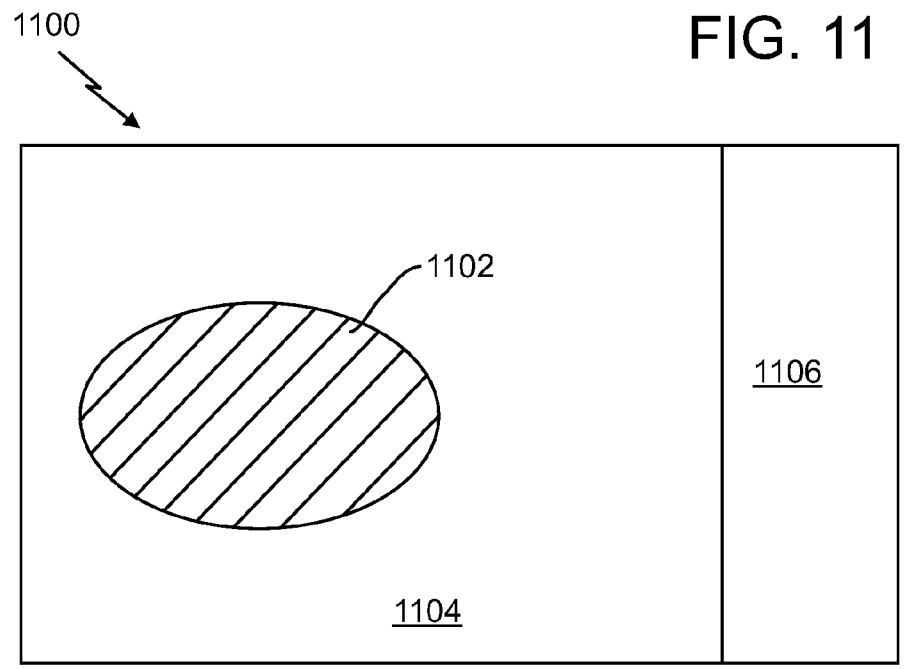
FIG. 11 shows a specific implementation of the system shown in FIG. 4 for use in a laboratory setting.

FIG. 11 shows a specific implementation of the system shown in FIG. 4 for use in a laboratory setting. In particular, the embodiment shown in FIG. 11 includes a neutron source 1102. In one embodiment, the neutron source 1102 may be a so-called "small chemical" neutron source. In particular, the neutron source 1102 may be formed of AmBe (americium beryllium). In a particular embodiment, the neutron source 1102 may be may be a 75 mCi AmBe source.

In one embodiment, the neutron source 1102 may be partially or completely surrounded by a moderator 1104. In one embodiment, the moderator 1104 need only be close to the neutron source 1102. In general, the moderator 1104 acts as a source for photons born out of inelastic scattering interactions of neutrons. In one embodiment, the moderator 1104 may be a hydrogen rich moderator. An example of a hydrogen rich moderator include various forms of high temperature plastics such polyethylene. Another example of a moderator 1104 may be a graphite moderator that can both slow down the neutrons and emit photons from a neutron inelastic scattering event.

The system of FIG. 11 also includes a target 1106. As discussed above, the target may be made of, for example, Gadolinium or Mercury. In one embodiment, the target 1106 may be formed of a plurality of different materials to produce a spectra having multiple gamma rays having differing energies.

The system shown in FIG. 11 may be referred to as a gamma ray production system or gamma ray source. The gamma rays produced may be isotropic in this embodiment. Of course, steering could be provided to produce collimated gamma rays. In addition, in one embodiment, the neutron source 1102 could be formed as a neutron generator resulting a fully source-less measurement.

Theoretically, a 50 cm$^3$ Hg target with a 75 mCi AmBe source may produce approximately 2E5 5.9 MeV gamma rays per second. Scaling the source activity up to 5 Ci, such as a logging source in a pig, will scale this up to 1E7 gamma rays per second. Gd has a factor of 15 more than Hg for the same sized source. These calculations consider pure targets of the desired isotope. Natural targets will reduce the number by the natural weight percent shown above.

Figure 12:
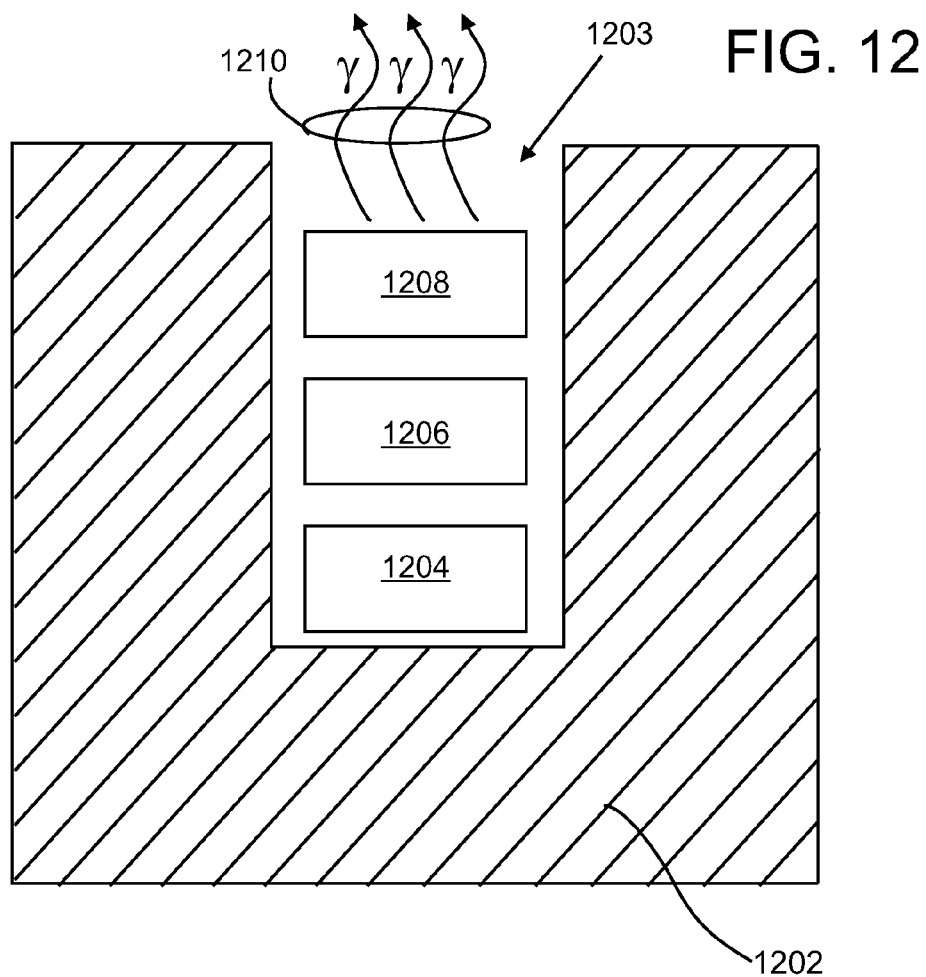
FIG. 12 shows another embodiment of a system according to an embodiment of the present invention.

FIG. 12 shows another embodiment of a system according to an embodiment of the present invention. This system may be used, for example, in a laboratory setting but is not so limited. In one embodiment, the system shown in FIG. 12 may be used to create collimated gamma rays.

The system of FIG. 12 includes a storage pig 1202. The storage pig 1202 may be any type of container for holding radioactive materials. The storage pig includes a throat 1203. Disposed within the throat 1203 are a neutron source 1204, a moderator 1206 and a target 1208. In one embodiment, the moderator 1206 is disposed between the neutron source 1204 and the target 1208. Because the target 1208 is disposed within the throat 1203, the resulting gamma rays 1210 may be collimated gamma rays.

The configuration shown in FIG. 12 may be desirable in the event that a large neutron source is used. The materials used for the neutron source 1204, the moderator 1206 and the target 1208 may be same as those described with respect to FIG. 11.

It shall be understood that for the embodiments shown in FIG. 11 and FIG. 12 there may be background gamma rays produced from neutron capture and neutron inelastic scattering but this will not pose any problems. The hydrogen in the polyethylene (if such is used as the moderator 1206) will produce 2.2 MeV gamma rays far below the region of interest. Iron has a 7.6 MeV inelastic gamma ray, but the production levels are much lower than Gd or Hg capture gamma production. Lead and oxygen present in shielding and the general environment will produce gamma rays out of the high-energy region of interest. Regardless, the effective cross sections presented for the target materials are much higher than other materials and production methods present.

It shall be understood that the production of gamma rays involving a neutron source and a target (and possibly other components) may be referred to herein as a sourceless production or simply sourceless. In the same manner, a "sourceless" operation, system or device according to one embodiment may not include a gamma ray source such as, for example, cesium-137 (Cs-137) that naturally produces gamma rays. Rather, a "sourceless" operation, system or device as the term is used herein shall refer to an operation, system or device that produces gamma rays neutron capture or inelastic collisions in a target material. "Neutron capture" or "capture" make reference to a kind of nuclear interaction in which a neutron collides with an atomic nucleus and is merged into the nucleus, thus forming a heavier nucleus. As a result, the heavier nucleus enters into a higher energy state. At least some of the energy of the neutron capture interaction is usually lost by emission of gamma rays based on the "inelastic collision," or "neutron inelastic scattering." These terms shall refer the production of gamma rays as the result of a collision in which an incoming neutron interacts with a target nucleus and causes the nucleus to become excited, thereby releasing a gamma ray before returning to the ground state. In inelastic collisions, the incoming neutron is not merged into the target nucleus, but transfers some of its energy to the target nucleus before that energy is released in the form of a gamma ray.

As is known in the art, gamma rays may be useful in performing density measurement. In one embodiment, the teachings herein may be utilized to perform sourceless density measurements. In one embodiment, the sourceless density measurement may be of the density of a material in an earth formation.

Figure 13:
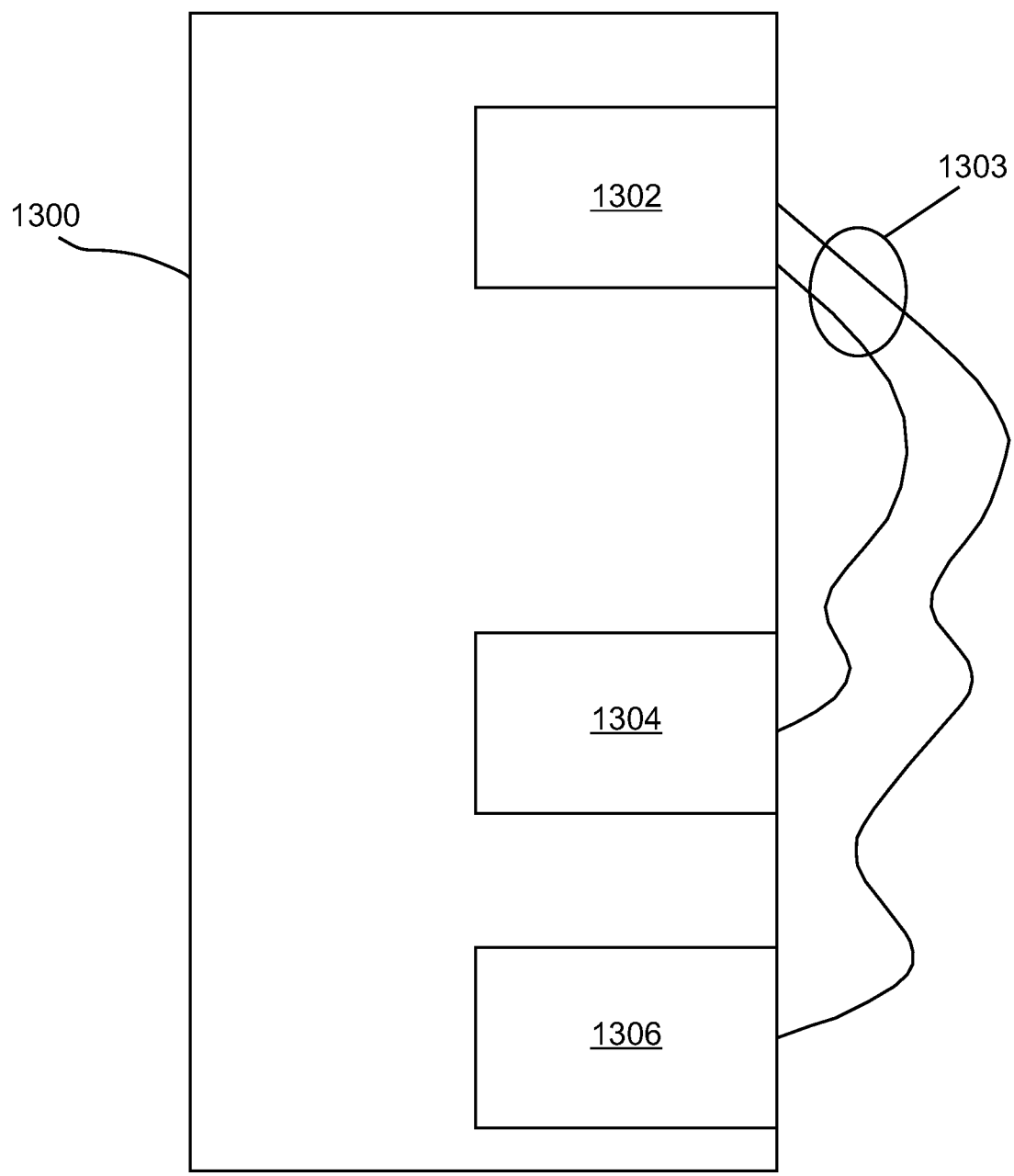
FIG. 13 is a diagram of basic components of a prior art gamma ray density tool.

Referring now to FIG. 13, a diagram of basic components of a prior art gamma ray density tool 1300 is shown. This tool 1300 includes a drill collar which contains a gamma-ray source 1302 and two spaced gamma-ray detector assemblies 1304 and 1306. All three components are placed along a single axis that has been located parallel to the axis of the tool 1300. The detector assembly 1304 closest to the gamma-ray source may be referred to as a "short space detector" and the detector assembly farthest away (1306) is referred to as a "long space detector." Gamma-ray shielding may be located between detector assemblies 1304, 1306 and gamma ray source 1302.

The tool 1300 is placed into service by loading it with the sealed chemical gamma ray source 1302 (typically cesium 137) and lowering it into a borehole. Gamma-rays 1303 are continuously emitted by the gamma ray source 1302 and these propagate out into the formation surrounding the borehole.

Two physical processes dominate the scattering and absorption of gamma rays at the energies used in density tools. They are Compton scattering and photoelectric absorption. A macroscopic cross section for Compton scattering, $\sigma_{es}$, (i.e., probability of scattering while passing through a set thickness of material) is proportional to the electron density in the formation and is weakly dependent on the energy of the incident gamma ray (on a graph, this falls fairly slowly with increasing energy). Since the electron density is, for most formations, approximately proportional to the bulk density, the Compton cross section, $\sigma_{es}$, is proportional to the density of the formation. The macroscopic photoelectric absorption cross section, $\sigma_{pe}$, is also proportional to the electron density. Unlike the Compton cross section, $\sigma_{es}$, photoelectric absorption cross section, $\sigma_{pe}$, is strongly dependent on the energy of the incident gamma rays and on the materials in the formation (the lithology).

Formation density is determined by measuring the attenuation of gamma rays through the formation. In this prior art tool, shielding is included in the tool 1300 to reduce a flux of gamma rays traveling straight through the tool 1300. This flux can be viewed as background noise for the formation signal. Density measurements made by using the two detectors 1304 and 1306 are combined to form a compensated measurement. Compensation for the mud and/or standoff in the borehole is usually accomplished through the use of the short space detector 1304 and the long space detector 1306. Since gamma rays travel through more of the formation to reach the long space detector 1306 than they do to reach the short space detector 1304, the long space detector 1306 shows a significantly larger count rate change for a given change in formation density. This allows for the compensation by using the two detector responses and a "rib" algorithm. The rib function, provides for the calculation of compensation (which should be equal to the difference between the true and the measured long space density), as a function of the difference between the short and long space densities. These aspects and other aspects are known in the prior art, and generally not discussed in greater depth herein. However, one reference that includes these aspects is U.S. Pat. No. 5,397,893, entitled "Method for analyzing formation data from a formation evaluation measurement-while-drilling logging tool." This patent issued on May 14, 1995 and is assigned to Baker Hughes Incorporated. Accordingly, such relevant aspects disclosed therein are incorporated herein by reference. Having thus provided some context, an introduction to one embodiment of the present invention is provided.

Disclosed herein are methods and apparatus for performing gamma-gamma density measurements using a neutron based instrument. The neutron-based instrument does not include a chemical gamma ray source, and therefore provides users with equipment that offers improved radiological safety as well as reduced cost. The teachings provided herein are particularly beneficial for making use of pulsed neutron generator based instruments deployed for other purposes, such as lithology and porosity measurements.

Embodiments of downhole tools using a pulsed neutron generator usually provide a burst of about 10E4-10E5 fast neutrons. When the neutron flux is averaged over time, this is equivalent to a steady state emission of about 10E8 neutrons/second. For these embodiments, an energy spectrum of the neutrons shows that the neutrons are very close to monoenergetic, and exhibit an initial energy of about 14.2 MeV, while an angular distribution of the neutrons is very close to isotropic. Therefore, neutrons provided by a pulsed neutron generator generally radiate in all directions, and penetrate not only into the formation direction but also into the tool itself. Accordingly, most tools making use of neutron sources include significant shielding for protection of other components.

In one embodiment, the systems and methods disclosed herein take advantage of the excess neutron population that is hazardous to other components on board the tool. As an overview, a sourceless gamma density tool includes a moderator close to the neutron generator. This is provided for thermalizing the high energy neutrons traveling into the tool and acting as a source for photons born out of inelastic scattering interactions of neutrons. Also include is a target material for capturing the thermalized neutrons. As a consequence of the target material capturing thermalized neutrons, prompt gamma emissions result.

Figure 14:
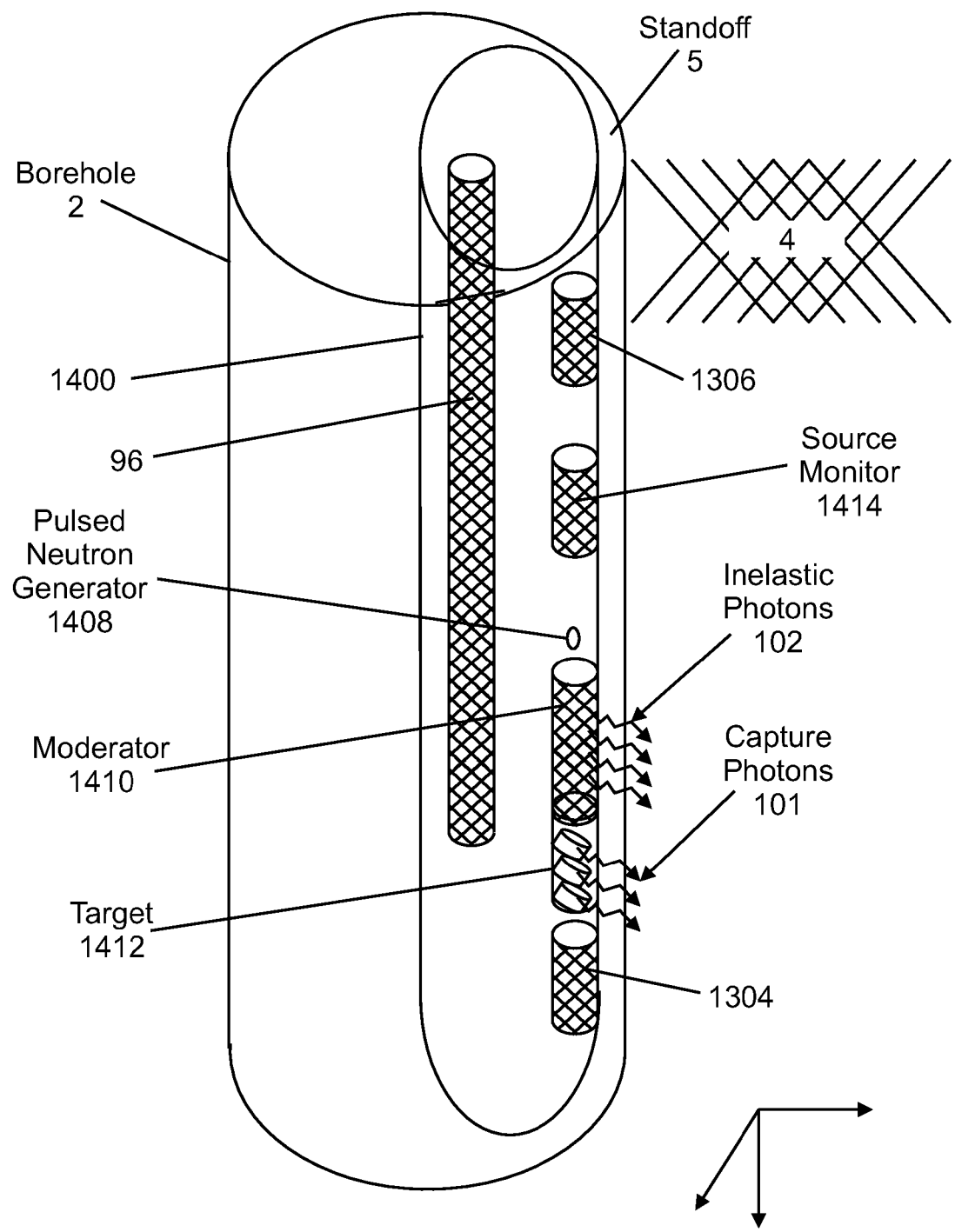
FIG. 14 depicts exemplary aspects of a sourceless gamma density tool according to one embodiment.

FIG. 14 depicts exemplary aspects of a sourceless gamma density tool 1400 according to one embodiment. The sourceless gamma density tool 1400 is shown as being disposed into a borehole 2 that traverses a formation 4. As in prior art instruments, the sourceless gamma density tool 1400 includes a short space detector 1304 and a long space detector 1306. Relative positioning of the short space detector 1304 and the long space detector 1306 is to be adjusted to obtain the best measurement possible. A neutron source 1408 is included, and in this embodiment, is a pulsed neutron generator. Arranged proximate to the neutron source 1408 is a moderator (and inelastic gamma source) 1410, which may be a hydrogen rich material. Although not as efficient as hydrogen in slowing down the neutrons, some other material may be chosen as well. Generally, located beyond the moderator and inelastic gamma source 1410 is a capture gamma source (target 1412) formed of a target material. The capture gamma source (target) 1412 is arranged to receive thermalized neutrons exiting from the moderator and inelastic gamma source 1410. The capture gamma source 1412 is formed of, among other things, a surrogate material selected for absorbing the thermalized neutrons and producing prompt gamma emissions.

Not shown in FIG. 14, but included in the sourceless gamma density tool 1400 as appropriate, may be various communications interfaces and channels, electronics units, power supplies and the like. Accordingly, a mud channel 96, shown in FIG. 14, is one example of a supporting component. The mud channel 96 generally provides for communication of data, such as by use of telemetry. The supporting components generally enable operation of the sourceless gamma density tool 1400, and may include components disposed topside. One example of a topside supporting component includes computing systems used for performing spectroscopy analyses.

While the sourceless gamma density tool 1400 is generally used in logging-while-drilling, the tool 1400 may be deployed using wireline systems as well. Accordingly, the embodiment shown in FIG. 14 may represent a portion of either one of a drill string or a wireline logging instrument. In further embodiments, the tool 1400 may be deployed by tractor and other such techniques as are known in the art. Further details about the tool 1400 may be found in U.S. Provisional Patent Application Ser. No. 61/167,328 filed Apr. 7, 2009, entitled Gamma Ray Generator, and which is hereby incorporated by reference in its entirety.

In one embodiment, the target 1412 may be formed of Mercury (Hg) or Gadolinium (Gd) for at least the reasons discussed above. In one embodiment, the target may include one or both Hg and Gd and may also include an additional material. As discussed above, this may allow for the production of gamma rays with different energies. This may allow for multiple independent density estimates or may allow for environmental estimates. Of course, the volumes of each material forming the target 1412 may be optimized based on respective counting rates and cross sections.

In one embodiment, the tool 1400 may also include a neutron flux monitor 1414. The neutron flux monitor 1414 may be used to regulate the output of the neutron source 1408.

Figure 15A:
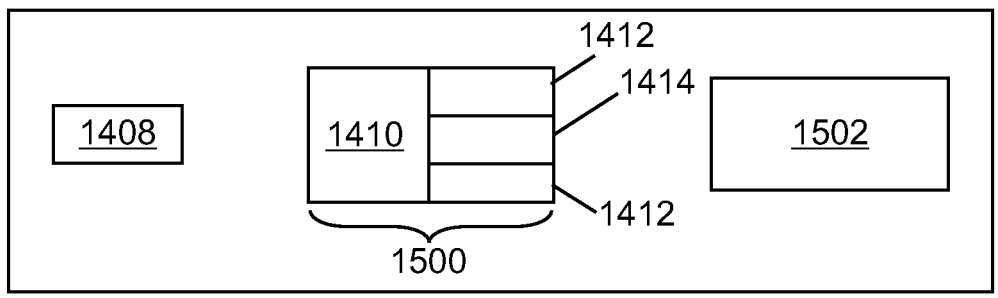
FIGS. 15A-C shows three possible configurations of the neutron source, moderator, target, and neutron source monitor as may be implemented in a tool according to one embodiment.
Figure 15B:
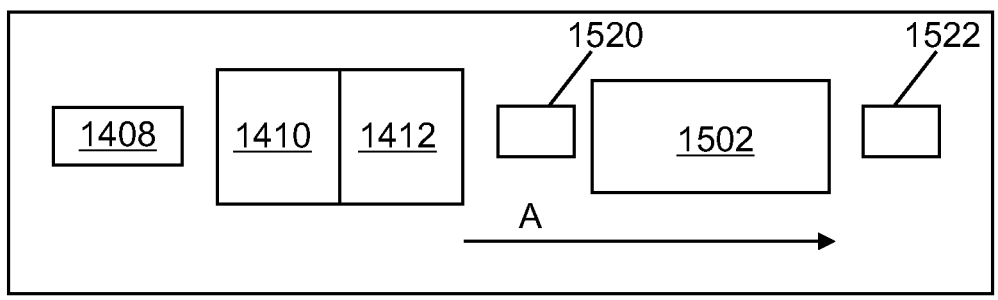
Figure 15C:
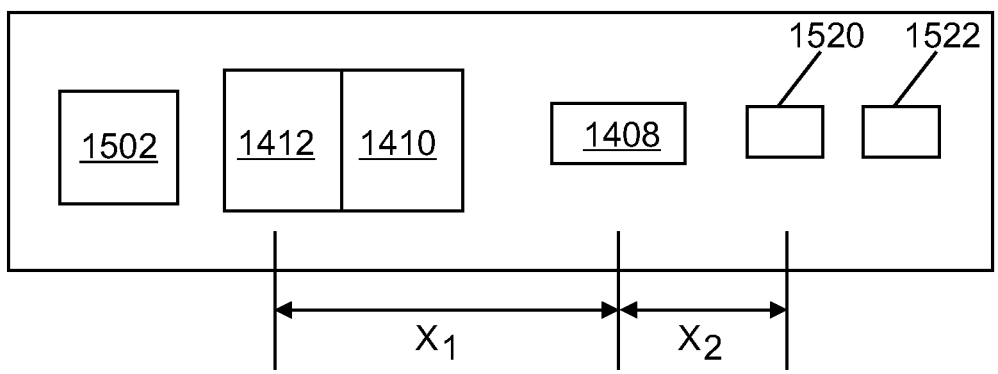

FIGS. 15A-C shows three possible configurations of the neutron source 1408, moderator 1410, target 1412, and neutron source monitor 1414 as may be implemented in a tool 1400. Of course, the configurations could be implemented in different environments as well.

In FIG. 15A shows a neutron source 1408 adjacent a clustered moderator/target 1500. The clustered moderator/target 1500 may include a moderator 1410 and two targets 1412 adjacent thereto. In this particular embodiment, the moderator 1410 contacts the two targets 1412. Of course, the moderator 1410 need not directly contact the targets 1412 and could be separated or slightly separated there from or another material could be place between them. Between the two targets 1412, in this embodiment, a neutron flux monitor 1414 is disposed. The neutron flux monitor 1414 may be formed, for example, of Helium 3 (He-3), Lithium 6 (Li-6) or Boron-10 (B-10). FIG. 15A also includes a gamma ray detector 1502 disposed further away from the neutron source 1408 than the targets 1412. The gamma ray detector 1502 may include both open and collimated scintillators. Of course, the gamma ray detector 1502 may be implemented as, for example, a near and far detector in two separate locations.

FIG. 15B shows an alternative arrangement of the neutron source 1408, moderator 1410, and target 1412. In this embodiment, the neutron source 1408 is adjacent the moderator 1410. In this particular embodiment, the moderator 1410 contacts the target 1412. Of course, the moderator 1410 need not directly contact the target 1412 and could be separated or slightly separated there from or another material could be place between them. In this arrangement, a first porosity detector 1520 is disposed adjacent the target 1412. A second porosity detector 1522 is disposed further from the target 1412 in the direction shown by arrow A. In one embodiment, the porosity detectors 1520 and 1522 may serve as neutron source monitor. In such an embodiment, the porosity detectors may be formed, for example, of He-3. The arrangement also includes the gamma ray detector 1502 disposed between the porosity detectors 1520 and 1522.

FIG. 15C shows yet another alterative arrangement according to one embodiment. In this embodiment, the gamma ray detector is adjacent to a first side of the target 1412. The moderator 1410 contacts a second side target 1412. Of course, the moderator 1410 need not directly contact the target 1412 and could be separated or slightly separated there from or another material could be place between them. A fixed distance ($X_1$) away from the target 1412 the neutron source 1408 is disposed. At another fixed distance ($X_2$) a porosity detector 1520 is disposed. The ratio of $X_1$ to $X_2$ may be used to approximate the neutrons reaching the target 1412. This arrangement may also include a second porosity detector 1522 disposed further from the neutron source 1408 on a side of the neutron source 1408 opposite the target 1412. In such an embodiment, the porosity detectors may formed, for example, of He-3.

The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom hole assemblies (BHA's) downhole tools, logging tools, drill string inserts, modules, internal housings and substrate portions thereof.

In support of the teachings herein, various analysis components may be used, including a digital and/or an analog system. For example, the electronic unit 9 or the processing system 11 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), voltage supply, vacuum supply, pressure supply, cooling component, heating component, motive force (such as a translational force, propulsional force or a rotational force), magnet, electromagnet, sensor, electrode, transmitter, receiver, transceiver, antenna, controller, optical unit, chemical analysis unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for performing an operation in a borehole penetrating the earth, the apparatus comprising:
    a carrier;
    a neutron source that emits neutrons and is disposed in the carrier;
    a target that produces gamma rays as a result of interactions between neutrons produced by the neutron source and at least one material forming the target, the target being disposed in the carrier in a fixed relationship relative to the carrier; and
    a gamma ray detector that detects the gamma rays produced by the target and is disposed in the carrier.

2. The apparatus of claim 1, wherein the neutron source comprises a reaction chamber configured to contain the nuclear fusion reaction.

3. The apparatus of claim 2, where in a shape of the reaction chamber is at least one of cylindrical and spherical.

4. The apparatus of claim 2, wherein a gas of fusible nuclei is disposed in the reaction chamber.

5. The apparatus of claim 1, wherein the neutron source comprises a chemical source including AmBe or Cf-252.

6. The apparatus of claim 1, wherein the target is formed from at least one of lead (Pb), gadolinium (Gd) and mercury (Hg).

7. The apparatus of claim 1, wherein the operation is a calibration of the gamma ray detector.

8. The apparatus of claim 1, wherein the target is at least partially formed of bismuth.

9. The apparatus of claim 1, wherein the operation is a sourceless density measurement.

10. The apparatus of claim 9, wherein the target is at least partially formed of mercury or gadolinium.

11. The apparatus of claim 9, wherein the target is at least partially formed of lead.

12. The apparatus of claim 1, wherein the operation is a measurement of the strength of the neutron source.

13. The apparatus of claim 12, wherein the target is formed of two or more materials.

14. The apparatus of claim 1, wherein the target and the detector are formed as a single element.

15. The apparatus of claim 14, wherein the detector is doped with particles that form the detector.

16. The apparatus of claim 14, wherein the detector is at least partially surrounded by the target.

17. The apparatus of claim 14, wherein the detector includes a well and the target is at least partially disposed within the well.

18. An apparatus for performing an operation in a borehole penetrating the earth, the apparatus comprising:
    a carrier;
    a neutron source that emits neutrons and is disposed in the carrier;
    a target that produces gamma rays as a result of interactions between neutrons produced by the neutron source and at least one material forming the target, the target being disposed in the carrier; and
    a gamma ray detector that detects the gamma rays produced by the target and is disposed in the carrier;
    wherein the target is formed of a first material and a second material, the first material producing gamma rays at a first energy level and the second material producing gamma rays at a second, different energy level.

19. An apparatus for performing an operation in a borehole penetrating the earth, the apparatus comprising:
    a carrier;
    a neutron source that emits neutrons and is disposed in the carrier;

a target that produces gamma rays as a result of interactions between neutrons produced by the neutron source and at least one material forming target, the target being disposed in the carrier;

a gamma ray detector that detects the gamma rays produced by the target and is disposed in the carrier; and a moderator in operable communication with the target.

20. The apparatus of claim 19, wherein the moderator is formed of a hydrogen containing material.

21. The apparatus of claim 19, further comprising:
a neutron flux monitor.

22. The apparatus of claim 21, wherein the neutron flux monitor is formed of at least one of He-3, Li-6 and B-10.

23. The apparatus of claim 21, wherein the neutron flux monitor contacts the moderator and the target.

24. The apparatus of claim 21, wherein the neutron flux monitor is disposed between the moderator and the detector.

25. The apparatus of claim 24, wherein the moderator contacts the target and is disposed on a first side of the neutron source and wherein the neutron flux monitor is disposed on a second side of the neutron source.

26. A prompt gamma ray source comprising:
a neutron source;
a moderator material; and
a target that produces gamma rays as a result of interactions between neutrons produced by the neutron source and at least one material forming the target and that it is in contact with the moderator material.

27. The gamma ray source of claim 26, wherein the moderator material contacts the target.

28. The gamma ray source of claim 26, wherein the moderator material at least partially surrounds the neutron source.

29. The gamma ray source of claim 26, wherein the neutron source and the moderator material are disposed with in a throat of a storage pig.

30. The gamma ray source of claim 29, wherein the target is at least partially disposed within the throat of the storage pig and produces collimated gamma rays.

31. The gamma ray source of claim 30, wherein the moderator material is at least partially between the neutron source and the target.

32. The gamma ray source of claim 26, further comprising:
a carrier that supports the neutron source, the moderator and the target.

33. The gamma ray source of claim 32, wherein the carrier is a borehole tool.

34. The gamma ray source of claim 26, wherein the target is at least partially formed of gadolinium (Gd) or mercury (Hg).

* * * * *